Jan. 17, 1956  P. A. NOXON ET AL  2,731,217
POSITIONING SYSTEM MONITOR
Filed April 11, 1950
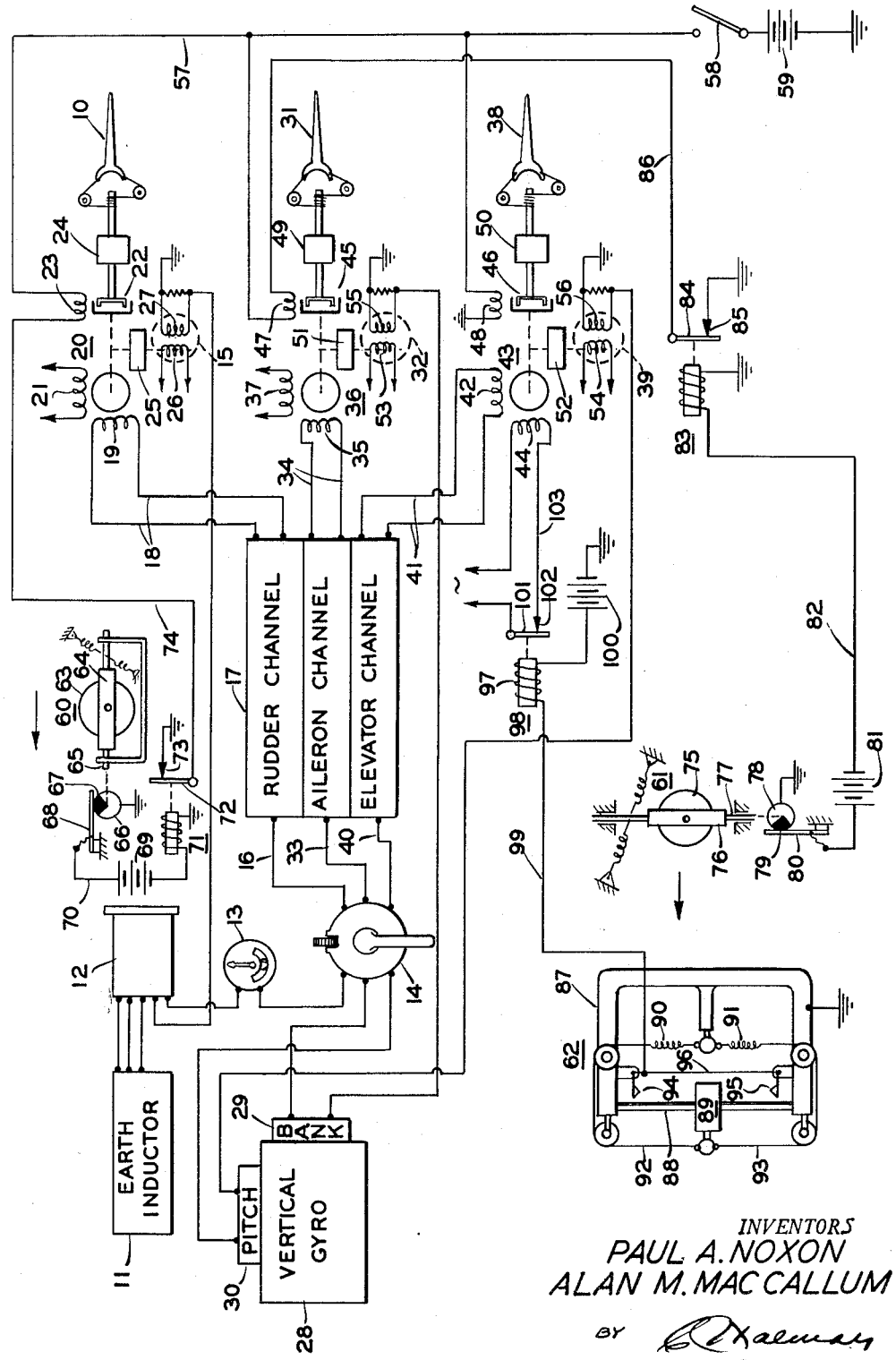
INVENTORS
PAUL A. NOXON
ALAN M. MAC CALLUM
BY
ATTORNEY United States Patent Office 2,731,217
Patented Jan. 17, 1956

2,731,217

POSITIONING SYSTEM MONITOR

Paul A. Noxon, Tenafly, and Alan M. MacCallum, Maywood, N. J., assignors to Bendix Aviation Corporation, Teterboro, N. J., a corporation of Delaware Application April 11, 1950, Serial No. 155,228

11 Claims. (Cl. 244—77)

The present invention relates generally to safety or monitoring apparatus for positioning systems and more particularly to apparatus of this general character adapted for preventing automatically improper control of an aircraft by an automatic pilot system.

Due to malfunction of an automatic pilot system an aircraft may be displaced at an excessive rate about any one of its control axes due to hard-over signals generated by the system and, in order to discontinue automatic control during such time, novel means are provided by the present invention to make the automatic pilot ineffective so that the human pilot may take over manual control of the craft.

An object of the present invention, therefore, is to provide a novel safety arrangement for monitoring the operation of a positioning system such as, for example, an aircraft automatic pilot system.

Another object of the present invention is to provide a novel monitoring system for an aircraft automatic pilot which in response to excessive rates of displacement of the craft about any one of its axes by the automatic pilot will make the automatic pilot ineffective to control the craft.

A further object is to provide a novel monitoring system for an aircraft automatic pilot comprising an acceleration responsive device for making the automatic pilot ineffective on the craft elevator surfaces during excessive accelerations in pitch.

Another object of the invention is to provide a novel monitoring arrangement for an aircraft automatic pilot whereby craft control due to hard-over signals generated as a result of malfunction of the automatic pilot is prevented automatically.

The above and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration only and is not designed as a definition of the limits of the invention.

The single figure of the drawing is a diagrammatic illustration of one embodiment of the novel safety apparatus of the present invention for monitoring the operation of an aircraft automatic pilot.

In its broader aspects the novel arrangement hereof comprises yaw and roll rate responsive means which supervise craft control by an automatic pilot in rudder and aileron and acceleration responsive means for supervising craft control by the automatic pilot in elevator. Where the rates of displacement about either the yaw or roll axes or the acceleration about the pitch axis exceed predetermined and allowable values the servomotors are either disabled from operating their related control surfaces or disconnected from the control surfaces.

Referring now to the single figure of the drawing for a more detailed description of the novel safety arrangement of the present invention, the latter is shown as applied to a conventional all electric, three axes of control aircraft automatic pilot. As illustrated, such an automatic pilot generally comprises for the control of a rudder 10, a compass consisting of a stabilized earth inductor element 11 and a master direction indicator device 12 which receives and reproduces for control purposes the signals of element 11. In addition to the compass signal, rate of turn, course-change and follow-up signals are developed by a rate of turn device 13, a turn signal generator contained in a manual turn control unit 14 and an inductive follow-up device 15.

The various signal generators are series connected with each other and by way of a conductor 16 with the input of the rudder channel of an amplifier 17, the output of which is fed by way of leads 18 to the variable phase winding 19 of a two-phase induction motor 20 whose second phase winding 21 is connected with a suitable source of current. Motor 20 drivable connects through an electromagnet clutch 22, having a control winding 23, and a gear reduction mechanism 24 with the rudder surface and through a gear reduction mechanism 25 with the wound rotor 26 of inductive follow-up device 15, whose stator winding 27 is fixed with respect to the craft.

For controlling the craft in bank and pitch, an artificial horizon or vertical gyro 28 is provided having bank and pitch take-offs 29 and 30. For control of aileron surface 31, bank, follow-up and bank trim signals are provided by bank take-off 29, inductive follow-up device 32 and a bank trim signal generator, incorporated in turn control unit 14. The various signal generators of the bank channel are series connected with each other and by way of a conductor 33 with the input of the aileron channel of the amplifier, the output of which connects by way of leads 34 with the variable phase winding 35 of a two-phase induction motor 36, whose second phase winding 37 is connected with a suitable source of current.

For control of elevator surface 38, on the other hand, pitch, follow-up and pitch trim signals are provided by pitch take-off 30, an inductive follow-up device 39 and a pitch trim signal generator incorporated in turn control unit 14. These control signals, like those of the rudder and aileron channels, are series connected with each other and by way of a conductor 40 with the input of the elevator channel of the amplifier, the output of which connects by way of leads 41 with the variable winding 42 of a two-phase induction motor 43, whose second phase winding 44 is connected with a suitable source of current.

Servomotors 36 and 43 drivably connect through electro-magnetic clutches 45 and 46, having control windings 47 and 48, respectively, and gear reduction mechanisms 49 and 50 with aileron and elevator surfaces 31 and 38 and through gear reduction mechanisms 51 and 52 with wound rotors 53 and 54 of inductive follow-up devices 32 and 39, whose stator windings 55 and 56 are fixed with respect to the craft.

Control windings 23, 47 and 48 of the rudder, aileron and elevator clutches have like ends connected to a common conductor 57 which connects through a clutch switch 58 with one side of a suitable battery 59, the opposite side of the latter being grounded as shown.

Coming now to the novel monitoring arrangement of the present invention, a yaw rate gyro 60 is used for monitoring automatic pilot operation in rudder, a roll rate gyro 61 is used for monitoring automatic pilot operation in aileron and an accelerometer 62 is used for monitoring automatic pilot operation in elevator.

Yaw rate gyro 60 comprises a conventional spring restrained two-degree-of-freedom gyro having a spinning rotor 63 mounted within a gimbal ring 64, the latter being provided with suitable trunnions 65 by virtue of which the gyro is mounted for precession about an axis aligned with the craft fore and aft axis to be responsive to yaw rate. Mechanically connected with one of trunnions 65 is a grounded conductor disc 66 having a sector shaped nonconducting portion 67. With the gyro centered i. e., in the absence of craft yaw displacement, portion 67 of conductor disc 66 is engaged by a conductor strip 68 which connects with one side of a battery 69 by way of a conductor 70. The opposite side of battery 69 connects with one end of a winding of a relay 71, the opposite end of the winding being grounded as shown. As shown, relay 71 is of a type which, when energized, moves its armature 72 out of engagement with a grounded fixed contact 73, the opposite end of the armature connecting with the free end of clutch control winding 23 by way of a lead 74.

Roll rate gyro 61 is generally similar to yaw rate gyro 60 in that it comprises a conventional spring restrained two-degree-of-freedom gyro having a spinning rotor 75 mounted within a gimbal ring 76, the latter being provided with trunnions 77. In the case of the roll rate gyro, however, the trunnions mount the gyro for precession about an axis parallel with the craft's vertical axis, the rotor spin axis being parallel with the craft's transverse axis. In this manner, rate gyro 61 responds to craft displacement about its roll axis. Mechanically connected with one of trunnions 77 is a grounded conductor disc 78 having a sector shaped non-conducting portion 79. With the gyro 61 centered, i. e., in the absence of craft roll displacement, portion 79 of conductor disc 78 is engaged by a conductor strip 80 which connects with one side of a battery 81. The opposite side of the battery connects by way of a lead 82 with one end of a winding of a relay 83, the opposite end of the winding being grounded as shown. Relay 83 is of a type which, when energized, moves its armature 84 out of engagement with a grounded fixed contact 85, the armature having one end thereof connected by way of a lead 86 with the free end of clutch control winding 47.

Accelerometer 62 is of conventional form and generally comprises a frame 87, fixed to the craft, having a guide rod 88 supported thereon between the two spaced arms thereof, the rod being arranged parallel with the craft's vertical axis. Slidably mounted on rod 88 is a weight 89 which is normally spring centered in the manner shown by means of springs 90, 91 and connecting cables 92, 93. The frame 87 is grounded and in response to up or down craft accelerations weight 89 is adapted to engage one or the other of spaced contacts 94, 95 which are mounted on the frame by way of suitable insulators and which interconnect by way of a conductor 96. A winding 97 of a relay 98 is connected at one of its ends by way of a conductor 99 with conductor 96, the opposite end of the winding connecting with one side of a battery 100, the other side of the battery being grounded as shown.

Relay 98 is of a character which, when de-energized, maintains a movable armature 101 in engagement with a fixed contact 102, the latter contact connecting with one end of a fixed phase winding 44 of elevator servomotor 43 by way of a lead 103. Armature 101 connects with one side of a suitable A. C. source, the opposite side of the source connecting with the free end of winding 44. In the absence of craft acceleration about its pitch axis, therefore, weight 89 of accelerometer 62 is maintained centered and relay 98 remains un-energized whereby servomotor 43 is effective to control elevator.

It will now be apparent to those skilled in the art that with the automatic pilot functioning properly and switch 53 in a closed position, control windings 23, 47 and 48 will be energized to drivably connect servomotors 20, 36 and 43 with their related rudder, aileron and elevator surfaces. Should for some reason the automatic pilot improperly generate a hard-over rudder signal the craft will be displaced rapidly in direction. Yaw rate gyro 60 is designed to respond to a predetermined rate of craft displacement in direction and, should such predetermined value be attained, gyro 60 will precess and angularly displace conductor disc 66 relative to conductor strip 68 so that the strip will engage the conductor portion of the disc. At such time relay 71 becomes energized to disengage armature 72 from fixed contact 73 whereby clutch control winding 23 is de-energized and the drivable connection broken between servomotor 20 and rudder 10.

In substantially the same manner, should the automatic pilot generate a hard-over aileron signal the craft will be displaced rapidly about its roll axis. Roll rate gyro 61 is designed so as to respond to a predetermined rate of craft displacement about its roll axis and, should such predetermined value be attained, gyro 61 will precess sufficiently to angularly displace conductor disc 78 relative to conductor strip 80 so that the strip will engage the conductor portion of the disc. At such time, relay 83 is energized whereupon movable armature 84 disengages fixed contact 85 so that clutch control winding 47 is de-energized and the drivable connection breaks between servo motor 36 and aileron surface 31.

Accelerometer 62 is so designed that in response to craft accelerations about its pitch axis exceeding allowable and predetermined limits, weight 89 will engage with either of fixed contacts 94 or 95 to energize relay 98 whereby the latter disengages movable armature 101 from fixed contact 102 to thereby remove the energizing source for fixed phase winding 44 so that servomotor 43 is made ineffective to control elevator surface 38.

There has thus been provided a novel monitoring arrangement for an aircraft automatic pilot whereby in response to excessive and dangerous rates of craft displacement about either the yaw or roll axes or both the drivable connection between the servomotors and the rudder and aileron surfaces is broken automatically. In response to craft accelerations about its pitch axis exceeding predetermined and allowable values, on the other hand, the servomotor normally controlling elevator is made ineffective automatically. It will be noted that should the malfunction occur in but one or two of pilot control channels, the pilot will be made ineffective only in those channels but effective in the remaining channel or channels.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

1. The combination with an aircraft automatic pilot having a servomotor for operating a control surface to displace the craft about an axis thereof, of means responsive to a predetermined rate of craft displacement about said axis, and means operated by said rate responsive means for making said motor ineffective on said surface.

2. The combination with an aircraft automatic pilot having a servomotor for operating a control surface to displace the craft about an axis thereof, of means comprising a two-degree-of-freedom gyroscope responsive to a predetermined rate of craft displacement about said axis for making said motor ineffective on said surface.

3. Apparatus for monitoring the operation of an aircraft automatic pilot having a servomotor for operating craft rudder to displace the craft about its direction axis, comprising means operative in response to a predetermined rate of craft displacement about said axis, and means actuated by said last-named means for making said motor ineffective on said rudder.

4. Apparatus for monitoring the operation of an aircraft automatic pilot having a servomotor for operating craft aileron to displace the craft about its roll axis, comprising means operative in response to a predetermined rate of craft displacement about said axis, and means actuated by said last-named means for making said motor ineffective on said aileron.

5. Apparatus for monitoring the operation of an aircraft automatic pilot having a servomotor for operating a craft surface to displace the craft about an axis thereof, comprising relay means for normally making the motor effective on said surface and adapted, when operated, to make the motor ineffective on said surface, and means comprising a rate-of-turn gyroscope responsive to a predetermined rate of craft displacement about said axis by said automatic pilot for operating said relay means.

6. Apparatus for monitoring the operation of an aircraft automatic pilot having a servomotor for operating a craft surface to displace the craft about an axis, thereof, comprising relay means operably associated with said motor for normally making the motor effective on said surface and adapted, when operated, to make the motor ineffective on said surface, and means comprising a two part device having one part connected to said relay and the other part movable relative to said first part constituting an accelerometer responsive to a predetermined craft acceleration about said axis which engages with said one part at said predetermined acceleration for operating said relay means.

7. Apparatus for monitoring the operation of an aircraft automatic pilot having a servomotor for operating a craft surface, the latter being adapted to displace the craft about an axis thereof, comprising relay means operably associated with said servomotor for normally enabling the motor to operate said surface and adapted, when operated, for disabling said motor from operating said surface, an accelerometer comprising a guide rod adapted to be arranged in parallel with said craft axis and a spring-constrained weight movable along said guide rod in response to craft acceleration about said axis, and spaced means adjacent said rod connected to said relay and actuated by said weight after a movement of said weight along said rod in response to a predetermined craft acceleration about said axis for operating said relay means.

8. Apparatus for monitoring the operation of an aircraft automatic pilot having a servomotor for operating craft elevator, the latter being adapted to displace the craft about the pitch axis thereof, comprising relay means for normally enabling the motor to operate said surface and adapted, when operated, for disabling said motor from operating said surface, an accelerometer comprising a guide rod adapted to be arranged in parallel with the craft pitch axis and a spring constrained mass movable along said guide rod in response to craft acceleration about the pitch axis, and means spaced a distance along said rod and connected to said relay means and actuated by said mass after a movement of said mass along said rod in response to a predetermined craft acceleration about said pitch axis for operating said relay means.

9. Apparatus for monitoring the operation of an aircraft automatic pilot having a servomotor for operating a craft surface to displace the craft about an axis thereof, comprising control means for normally making the motor effective on said surface and adapted, when operated, to make the motor ineffective on said surface, and means comprising a spring restrained two-degree-of-freedom gyroscope responsive to a predetermined rate of craft displacement about said axis by said automatic pilot for operating said control means.

10. Apparatus for monitoring the operation of an aircraft automatic pilot having a servomotor for operating a craft surface to displace the craft about an axis thereof, comprising relay means associated with said motor for normally making the motor effective on said surface and adapted, when operated, to make the motor ineffective on said surface, means movable within predetermined space limits during normal craft displacement about said axis by said automatic pilot and being movable beyond said limits during abnormal rapid craft displacement about said axis by said automatic pilot, and means operably associated with said relay means and responsive to movement of said movable means beyond said predetermined limits for operating said relay means.

11. Apparatus for monitoring the response of a craft to the operation of a control surface, comprising a servomotor associated with said surface for the operation of the latter, means operably associated with said servomotor and having an energized condition and a nonenergized condition wherein one condition renders said servomotor effective for the operation of said surface and the other condition renders said servomotor ineffective for the operation of said surface, an energy source, a reference means, and means for operatively connecting said energy source to said first named means for energizing the latter including a two part device which has one part connected to said first named means and the other part constituting a portion of said reference means and being movable with respect to said first part from a reference position an amount corresponding to said craft response, said second part being operative only after a predetermined amount of movement from said reference portion to complete the operative connection of said energy source to energize said first named means.

References Cited in the file of this patent
UNITED STATES PATENTS

| | | |
|---|---|---|
| 2,439,750 | Nisbet et al. | Apr. 13, 1948 |
| 2,480,574 | Hanna et al. | Aug. 30, 1949 |
| 2,487,793 | Esval et al. | Nov. 15, 1949 |
| 2,595,250 | Harcum | May 6, 1952 |

FOREIGN PATENTS

| | | |
|---|---|---|
| 624,201 | Great Britain | May 30, 1949 |